United States Patent [19]

Barnsfather

[11] Patent Number: 4,730,951

[45] Date of Patent: Mar. 15, 1988

[54] DRIVE COUPLING

[75] Inventor: Gebus Barnsfather, Taylorsville, Ind.

[73] Assignee: Reliance Electric Company, Greenville, S.C.

[21] Appl. No.: 9,706

[22] Filed: Feb. 2, 1987

[51] Int. Cl.$^4$ ............................................. F16B 2/06
[52] U.S. Cl. .................................... 403/24; 403/302; 403/287
[58] Field of Search ................ 403/260, 287, 24, 356, 403/302, 301

[56] References Cited

U.S. PATENT DOCUMENTS 4,217,061  8/1980  Eiland ............................. 403/356 X
4,337,406  6/1982  Binder ............................. 403/287 X

OTHER PUBLICATIONS

Brochure–"Type C Tapered Roller Bearings".
Brochure–"Gold Line with Skwezloc".
Brochure–"Modular Building Block System, Etc", Horton Manufacturing Co., Inc.

*Primary Examiner*—Andrew V. Kundrat
*Attorney, Agent, or Firm*—Dority & Manning

[57] ABSTRACT

This invention relates to a drive coupling for connecting an output shaft such as for a motor to an input pinion such as for a reducer. A coupling member which has an intermediate portion supported for rotation in bearings in a bracket which is mounted on a motor. The coupling member has one end portion in the form of a slotted sleeve which extends about the motor shaft and is clamped thereto by a clamping collar. The other end of the coupling member is provided with a bore for receiving a pinion shaft in a force-fit relationshp. The pinion shaft may be pinned to the coupling member by means of a spiral pin and the slotted sleeve may be keyed to the motor output shaft by means of a suitable slot and key arrangement.

17 Claims, 4 Drawing Figures

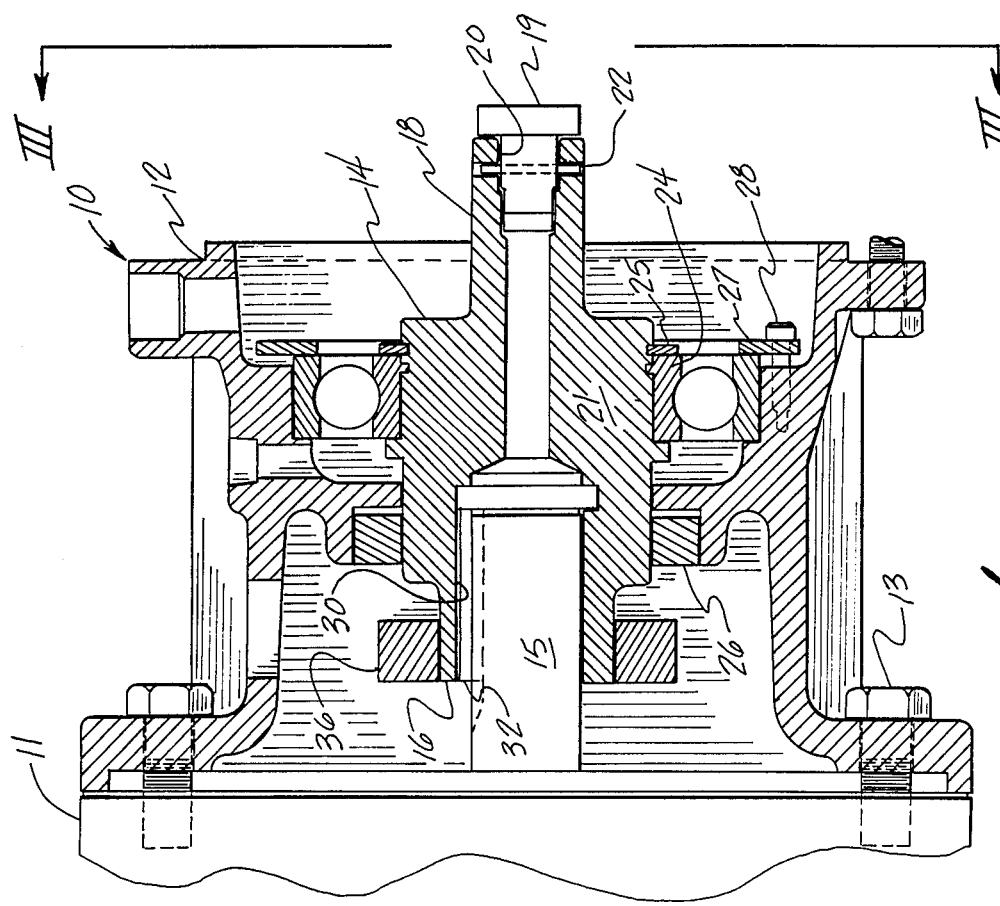

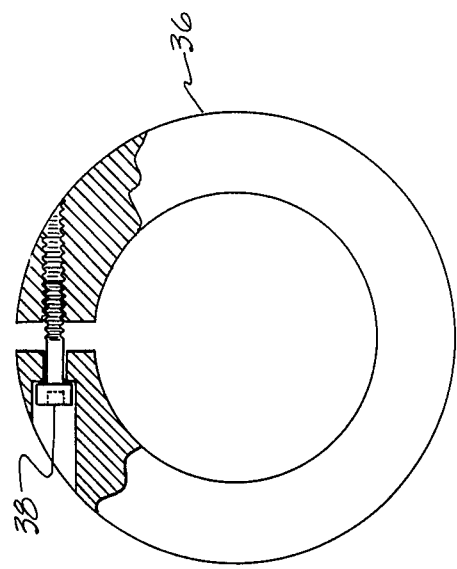
Fig. H.
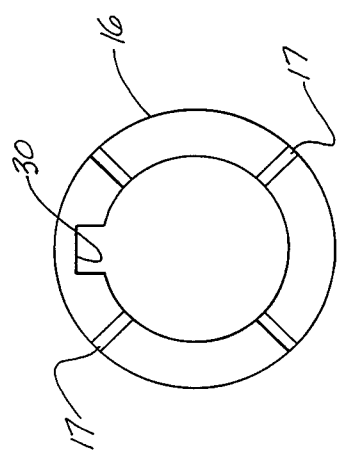
Fig. P.

DRIVE COUPLING

BACKGROUND OF THE INVENTION

This invention relates to a drive coupling for connecting an output shaft, such as of a motor to an input pinion, such as for a reducer.

Previous methods of utilizing motors, (for example, C-face motors) with reducers have typically utilized couplings that required significant length and utilized splines or some other costly means to connect the output shaft of the motor to the input pinion. Typically, there is a slip fit between the output shaft of the motor and the coupling which allows slight movement between the shaft and the coupling. This results in fretting corrosion. Such fretting corrosion eventually wears the coupling bore and the motor shaft and frequently makes disassembly and reassembly difficult if not impossible. In such devices, the small clearance between the coupling and the motor shaft also makes assembly and disassembly of the motor and coupling very difficult.

SUMMARY OF THE INVENTION

It is an object of the invention to provide an improved drive coupling for connecting an output shaft of a motor to an input pinion.

It is another object of the invention to provide an improved drive coupling for removably connecting the output shaft of a motor to the input pinion of a reducer which includes a sleeve portion which slips easily over the output shaft of the motor and is clamped thereto for rotation therewith.

These objects, and others which will become apparent, are accomplished by various embodiments of the present invention, one exemplary such embodiment providing a drive coupling which includes in exemplary part a slotted sleeve extension, formed as part of a coupling member mounted on bearings supported by a main bracket element to fit over the output shaft of a motor on which such bracket element is mounted, the slotted sleeve being clamped in contact with the motor shaft for rotation therewith and an end of such coupling member opposite the slotted sleeve extension thereof being adapted for rotationally driving a pinion shaft.

BRIEF DESCRIPTION OF THE DRAWINGS

A full and enabling description of the invention will be more readily understood from the attached specification, in conjunction with the appended drawings in which:

FIG. 1 is a side elevation, in section, of an exemplary drive coupling, constructed in accordance with the invention;

FIG. 2 is an end view of the slotted sleeve portion of the coupling member, illustrated in FIG. 1;

FIG. 4 is an end view of a clamping collar, in partial section, constructed in accordance with FIG. 1.

DESCRIPTION OF A PREFERRED EMBODIMENT

Figure 3:
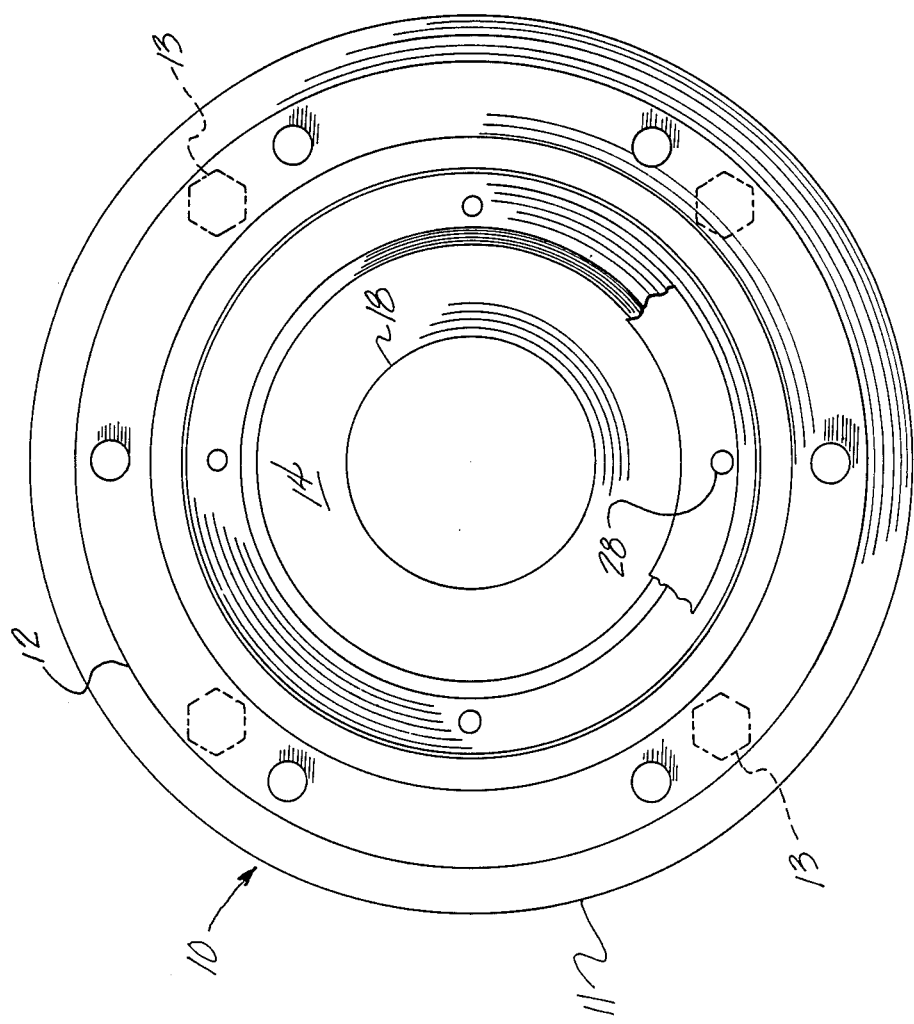
FIG. 3 is an end view of a drive coupling constructed in accordance with the invention as seen generally along line 3—3 of FIG. 1.

Referring now to the drawings, wherein repeat use of reference characters indicates same or analgous features or elements of this invention, a drive coupling 10 is provided for connecting the motor shaft 15 to an input pinion 19. Drive coupling 10 comprises a main bracket element 12 which is mounted on C-face motor 11 by means of bolts 13. A coupling member 14 includes on one end thereof a slotted sleeve extension portion 16, which is adapted to be disposed about motor shaft 15 and keyed thereto by key 32 in key slot 30.

Slotted sleeve portion 16 is an axial extension of member 14 and includes a series of slots 17 (see FIG. 2). Sleeve 16 fits about shaft 15 with a slight clearance when slots 17 are not compressed. A clamping collar 36 is disposed about sleeve 16 with key 32 in place. Bolt 38 (see FIG. 4) of the collar is tightened by a suitable wrench to tighten the clamping collar 36 about the slotted sleeve 16, thereby compressing slots 17 of the sleeve so as to secure such sleeve about motor shaft 15. Such arrangement ensures a tight and secure fit thereon for the coupling member, while also centering the shaft therein. Such arrangement also eliminates clearance between the motor shaft and coupling so as to eliminate any chance of fretting corrosion, resulting in greatly improved serviceability of the motor. For example, by elimination corrosion, coupling disassembly is facilitated.

Coupling member 14 further includes an intermediate portion 21 which is supported in bracket 12 by suitable bearings 24 for rotation with motor output shaft 15. A seal 26 is also disposed circumferentially about intermediate portion 21 and axially between such intermediate portion and a portion of the bracket. The inner race of bearings 24 is held in place by a removable retainer ring 25 which rotates with coupling member 14. The outer race of the bearings is held in place by another removable retaining ring 27 which is held in place by a series of screws 28 received in bracket 12. Hence, removal of seal 26 is readily accomplished merely by removing ring 27, and then withdrawing bearings 24 and member 14 together as an assembly (once collar 36 is loosened). Of course, bearings 24 and member 14 could be separately withdrawn by removing both rings 25 and 27.

On the end of coupling member 14 opposite slotted sleeve portion 16 is an output portion 18 which is adapted to receive in pinion bore 20 thereof the pinion shaft of a pinion 19. The pinion may be held in place in bore 20 by means of a spiral pin 22.

A coupling in accordance with a preferred embodiment the invention both supports the input pinion and drivingly connects it with the output shaft of the C-face motor. The input pinion shaft is pressed into the output portion 18 of the coupling member 14, and slotted sleeve portion 16 thereof is sized to readily accommodate the motor output shaft 15. Pinion bore 20 preferably extends all the way through coupling member 14 into communication with sleeve 16 thereof so as to facilitate the removal of the pinion when it is necessary to change the pinion. This can be done simply by removing the coupling member from its support in the bracket (generally including removal of ring 27, as described above) and its connection with the output shaft of the motor and using a smaller diameter rod or punch to push the pinion out of its force-fit connection with bore 20 of the output portion of the coupling member.

As noted above, sleeve portion 16 of the coupling member preferably defines a series of slots 17 about its periphery. Such slots make assembly with the motor shaft much easier. The clamping collar 36 is then installed over the slotted sleeve. When the clamping collar is tightened about the slotted sleeve 16, sleeve 16 is compressed and firmly secured to the motor shaft. This eliminates any clearance between the motor shaft and the slotted sleeve portion of the coupling member and also centers the motor shaft precisely in the center of the coupling member. Elimination of any clearance between the motor shaft 15 and the coupling member eliminates any chance of fretting corrosion. Hence, the motor can easily be removed when necessary, as described above.

Input pinions for reducers are often designed so that there is one pinion shaft diameter for each motor size, independent of the reducer size. This feature, plus the fact that many C-face motors have common diameter output shafts, permits a designed family of thirteen couplings to adapt twenty-three different motors to eight different size reducers. Thus, all that is required to use different size C-face motors on various reducers is to change a coupling (provided in accordance with the present invention) that connects the two.

It will be understood, of course, that while the form of the invention herein shown and described constitutes a preferred embodiment of the invention, it is not intended to illustrate all possible forms of the invention. It will be further understood that the words used are words of description rather than of limitation, and that various changes may be made without departing from the spirit and/or the scope of the invention herein disclosed.

What is claimed is:

1. A drive coupling for connection to an output shaft of drive means, said coupling comprising;
   a bracket adapted for securement to the drive means;
   a coupling member rotatably received within said bracket, including a first end portion defining a sleeve for securement to the output shaft, said sleeve defining at least one elongated slot therethrough, and said member further including an opposite end portion defining a coupling output shaft adapted for coupling to a pinion shaft; and
   clamping means received about said sleeve for tightening same about the drive means output shaft.

2. A drive coupling as in claim 1, wherein said means received about said sleeve comprise a clamping collar disposed about said sleeve for compressing said slot thereof.

3. A drive coupling as in claim 1, further comprising bearings supported by said bracket and rotatably receiving said coupling member.

4. A drive coupling as set forth in claim 1, wherein said sleeve has a plurality of slots therethrough.

5. A drive coupling as set forth in claim 1, wherein said sleeve is keyed to the motor output shaft for rotation therewith.

6. A drive coupling as set forth in claim 3, wherein said bearings comprise ball bearings.

7. A drive coupling as set forth in claim 1, wherein said opposite end portion of said coupling member has a pinion shaft bore for receiving the shaft of a pinion in a force-fit relationship, and the drive means comprises a C-face electric motor.

8. A drive coupling for connection to an output shaft of drive means, said coupling comprising;
   a bracket adapted for securement to the drive means;
   a coupling member rotatably received within said bracket, including a first end portion defining a sleeve for securement to the output shaft, said sleeve defining at least one elongated slot therethrough, and said member further including an opposite end portion defining a coupling output shaft; and
   means received about said sleeve for tightening same about the drive means output shaft; wherein
   said opposite end portion of said coupling member has a pinion shaft bore for receiving the shaft of a pinion in a force-fit relationship, and the drive means comprises a C-face electric motor; and further wherein
   said pinion shaft bore extends the length of said coupling member so as to communicate with said first end portion sleeve thereof to permit a pinion shaft received in said pinion shaft bore to be loosened therefrom by a rod inserted in said sleeve and directed along said extended bore towards said opposite end portion of said coupling member.

9. A drive coupling for connection to an output shaft of drive means, said coupling comprising;
   a bracket adapted for securement to the drive means;
   a coupling member rotatably received within said bracket, including a first end portion defining a sleeve for securement to the output shaft, said sleeve defining at least one elongated slot therethrough, and said member further including an opposite end portion defining a coupling output shaft; and
   means received about said sleeve for tightening same about the drive means output shaft; wherein
   said opposite end portion of said coupling member has a pinion shaft bore for receiving the shaft of a pinion in a force-fit relationship, and the drive means comprises a C-face electric motor; and further wherein
   the pinion shaft is pinned to said opposite end portion for rotation therewith.

10. A drive coupling as set forth in claim 2, wherein said clamping collar is a one-piece collar with a slot therein and includes a bolt for bringing the walls of said slot of said collar together so as to selectively clamp said sleeve onto the drive means output shaft.

11. A drive for a pinion comprising:
    (a) motor means having an output shaft;
    (b) a bracket supported by said motor means and adjacent to said output shaft thereof;
    (c) bearing means supported on said bracket;
    (d) a coupling member having an intermediate portion supported for rotation in said bearing means, a first end portion comprising a sleeve having at least one slot therein and disposed about the end of said motor shaft, and another end portion having a pinion shaft bore for receiving a pinion shaft integral with said input pinion;
    (e) a clamping collar disposed about said sleeve for clamping said sleeve to said motor output shaft and centered thereabout; and
    (f) an input pinion having integral therewith a pinion shaft disposed within said pinion shaft bore of said another end portion of said coupling member.

12. A drive coupling as set forth in claim 11, wherein said sleeve has a plurality of slots therein.

13. A drive coupling as set forth in claim 12, wherein said sleeve is keyed to said motor means output shaft for rotation therewith.

14. A drive coupling as set forth in claim 11, wherein said bearing means comprise ball bearings.

15. A drive coupling as set forth in claim 11, wherein said pinion shaft bore of said coupling member is adapted for receiving the shaft of a pinion in a force-fit relationship.

16. A drive shaft for a pinion comprising:
   (a) motor means having an output shaft;
   (b) a bracket supported by said motor means and adjacent to said output shaft thereof;
   (c) bearing means supported on said bracket;
   (d) a coupling member having an intermediate portion supported for rotation in said bearing means, a first end portion comprising a sleeve having at least one slot therein and disposed about the end of said motor shaft, and another end portion having a pinion shaft bore for receiving a pinion shaft integral with said input pinion;
   (e) a clamping collar disposed about said sleeve for clamping said sleeve to said motor output shaft and centered thereabout; and
   (f) an input pinion having integral therewith a pinion shaft disposed within said pinion shaft bore of said another end portion of said coupling member; wherein said pinion shaft is pinned to said another end portion for rotation therewith.

17. A drive coupling as set forth in claim 11, wherein said clamping collar is a one-piece collar with a slot therein and a threaded bolt for bringing the walls of said slot of said collar together so as to clamp said sleeve onto said motor means output shaft.

* * * * *